United States Patent
Nemeth et al.

(10) Patent No.: US 8,511,452 B2
(45) Date of Patent: Aug. 20, 2013

(54) CLUTCH SYSTEM AND METHOD FOR OPERATING A CLUTCH SYSTEM

(75) Inventors: Huba Nemeth, Budapest (HU); Tibor Kandar, Kacorlak (HU); Zoltan Riba, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 13/532,273

(22) Filed: Jun. 25, 2012

(65) Prior Publication Data

US 2012/0298469 A1  Nov. 29, 2012

Related U.S. Application Data

(63) Continuation of application No. PCT/EP2010/069734, filed on Dec. 15, 2010.

(30) Foreign Application Priority Data

Dec. 23, 2009  (DE) .......................... 10 2009 060 182

(51) Int. Cl.
*F16D 48/02* (2006.01)

(52) U.S. Cl.
USPC ....................................... 192/85.63

(58) Field of Classification Search
None
See application file for complete search history.

(56) References Cited

U.S. PATENT DOCUMENTS

| | | | | |
|---|---|---|---|---|
| 3,933,080 A * | 1/1976 | Corrie | ............................ | 91/394 |
| 5,004,086 A | 4/1991 | Petzold et al. | | |
| 5,415,303 A * | 5/1995 | Hodges et al. | ................. | 213/43 |
| 5,967,285 A * | 10/1999 | Mohan et al. | ............... | 192/85.63 |
| 6,183,387 B1 * | 2/2001 | Yoshioka | ......................... | 475/88 |
| 6,283,885 B1 * | 9/2001 | Irwin | ................................. | 475/88 |
| 6,681,912 B2 * | 1/2004 | Suzuki et al. | ............... | 192/85.63 |
| 6,789,658 B2 | 9/2004 | Busold et al. | | |
| 7,275,473 B2 * | 10/2007 | Mohlmann | ..................... | 91/536 |
| 8,187,148 B2 | 5/2012 | Petzold et al. | | |
| 2010/0155192 A1 * | 6/2010 | Kohlbock | .................. | 192/85.63 |

FOREIGN PATENT DOCUMENTS

| | | |
|---|---|---|
| DE | 40 31 808 A1 | 4/1992 |
| DE | 101 20 113 A1 | 10/2002 |
| DE | 101 43 833 A1 | 3/2003 |
| DE | 10 2005 006 431 A1 | 8/2006 |

(Continued)

OTHER PUBLICATIONS

International Preliminary Report on Patentability and Written Opinion of the international Searching Authority including English translation dated Jul. 19, 2012 (seventeen (17) pages).
International Search Report dated Apr. 6, 2011 with English translation (six (6) pages).

(Continued)

*Primary Examiner* — Rodney Bonck
(74) *Attorney, Agent, or Firm* — Crowell & Moring LLP

(57) ABSTRACT

A clutch system for closing and interrupting a force flow includes a clutch actuator that can have a pressure medium applied thereto, a first electrically actuatable valve device and a second electrically actuatable valve device. Pressure medium can be fed into a switching chamber of the clutch actuator by the first valve device for building up pressure, and pressure medium can be discharged again by the second valve device for releasing pressure. The clutch system interrupts or closes the force flow at a pressure P≧Pd in the switching chamber. A method for operating the clutch system for closing and interrupting a force flow prevents a subsequent pressure buildup in the switching chamber sufficient for actuating the clutch system if the first valve device and the second valve device malfunction.

9 Claims, 6 Drawing Sheets

(56) References Cited

FOREIGN PATENT DOCUMENTS

| | | |
|---|---|---|
| DE | 10 2006 035 134 A1 | 1/2008 |
| FR | 2 829 541 A1 | 3/2003 |
| WO | WO 88/10376 A1 | 12/1988 |
| WO | WO 2005/064187 A1 | 7/2005 |

OTHER PUBLICATIONS

German Office Action dated Jul. 28, 2010 with English translation (twelve (12) pages).

German Office Action dated Sep. 21, 2011 with partial English translation (seven (7) pages).

* cited by examiner

CLUTCH SYSTEM AND METHOD FOR OPERATING A CLUTCH SYSTEM

CROSS-REFERENCE TO RELATED APPLICATIONS

This application is a continuation of PCT International Application No. PCT/EP2010/069734, filed Dec. 15, 2010, which claims priority under 35 U.S.C. §119 from German Patent Application No. DE 10 2009 060 182.1, filed Dec. 23, 2009, the entire disclosures of which are herein expressly incorporated by reference.

BACKGROUND AND SUMMARY OF THE INVENTION

The invention relates to a clutch system for closing and interrupting a force flow, having a clutch actuator to which a pressure medium can be applied, a first electrically actuatable valve device, and a second electrically actuatable valve device. Pressure medium can be supplied via the first valve device to a switching chamber of the clutch actuator to build up pressure and supplied pressure medium can be discharged again via the second valve device to release pressure. The clutch system interrupts or closes the force flow at a pressure $P \geq Pd$ in the switching chamber.

Furthermore, the invention relates to a method for operating a clutch system for closing and interrupting a force flow, having a clutch actuator to which pressure medium can be applied, a first electrically actuatable valve device, and a second electrically actuatable valve device. Pressure medium is supplied via the first valve device to a switching chamber of the clutch actuator to build up pressure and supplied pressure medium is discharged again via the second valve device to release pressure. The clutch system interrupts the force flow at a pressure $P \geq Pd$ in the switching chamber.

Such a clutch system is known, for example, from DE 10 2006 035 134 A1 and is shown in schematic form in FIG. 2.

FIG. 2 shows a clutch system 10 having a clutch actuator 12 including a switching chamber 18, a first valve device 14 and a second valve device 16, which are coupled to a supply connection 36 or a deaeration connection 54, respectively. The first valve device 14 includes a first aeration valve 38' and a second aeration valve 40', which are arranged in parallel to one another in series with a throttle 46 or a throttle 48, respectively. The first aeration valve 38' and the second aeration valve 40' are implemented as electrically activatable 2/2-way valves, which are transferred in the deenergized state by a restoring spring 42' or a restoring spring 44', respectively, into their closed switching positions. The provision of aeration valves 38', 40' arranged parallel to one another represents a redundant design of the first valve device 14. The number of the aeration valves 38', 40' arranged parallel to one another is thus arbitrarily variable.

A filter 32 and a check valve 34 are arranged between the first valve device 14 and the aeration connection 36. The second valve device 16 includes a first deaeration valve 24 and a second deaeration valve 26', which are arranged parallel to one another and in series to a throttle 20' or 50', respectively. The first deaeration valve 24 and the second deaeration valve 26' are implemented as electrically activatable 2/2-way valves, which are transferred in their deenergized state by a restoring spring 22 or a restoring spring 52, respectively, into their closed switching positions. Since the parallel arrangement of both deaeration valves 24, 26' in the second valve device 16 is also a result of redundancy, their number, analogously to the number of the aeration valves 38', 40' arranged parallel to one another in the first valve device 14, is also variable.

Pressure medium, for example, compressed air or hydraulic oil, is supplied to the illustrated clutch system 10 via the supply connection 36. Backflow of the supplied pressure medium is prevented by the check valve 34. The supplied pressure medium is purified by the filter 32, in order to prevent contamination-related failures of the downstream components, in particular the first valve device 14 and the second valve device 16. By energizing one or both aeration valves 38', 40' in the first valve device 14, the pressure medium can reach the switching chamber 18 of the clutch actuator 12 and cause a buildup of pressure therein. If the pressure P prevailing in the switching chamber 18 exceeds a switching pressure Pd required for actuating the clutch system 10, the clutch actuator 12 is actuated to interrupt or close a force flow. For example, the clutch provided in a drivetrain of a motor vehicle can be opened or closed, respectively, so that a force transmission from the drive motor of the motor vehicle to the wheels of the motor vehicle is produced or interrupted, respectively. By energizing the first deaeration valve 24 and/or the second deaeration valve 26', which are arranged in the second valve arrangement 16, the pressure P prevailing in the switching chamber 18 can take place by discharging the pressure medium present therein via the deaeration connection 54.

The actuation of the illustrated clutch system 10 is typically made possible by a control unit (not shown), which can activate either the first valve device 14 or the second valve device 16 to actuate the clutch actuator 12. The illustrated clutch system 10 is designed so that in the event of a power failure, the pressure P prevailing in the switching chamber 18 is maintained, since both the first valve device 14 and also the second valve device 16 are transferred into blocking switching states by the restoring springs 22, 42', 44', 52.

This behavior of the clutch system 10 is problematic, however, if in the event of a deaerated switching chamber 18, a leak of the aeration valves 38', 40' in case of defect results in an uncontrolled pressure increase in the switching chamber 18, which could result in an undesired actuation of the clutch actuator 12 and/or a pressure-related overload of parts of the clutch.

The present invention is based on the object of solving these problems.

This and other objects are achieved according to the invention in that measures are provided in order, in the event of a defect of the first valve device and the second valve device, to avoid a subsequent pressure increase in the switching chamber which is sufficient to actuate the clutch system. Undesired actuation and a pressure-related overload of the clutch system can be avoided by this measure. Concrete technical implementations are described as examples hereafter.

A safety valve may be provided, which opens at a pressure $P \geq P1$, wherein $P1 < Pd$. Through the provision of the safety valve, a release of pressure in the switching chamber is possible while bypassing the second valve device. The release of pressure can be performed from a settable pressure level P1 of the opening pressure of the pressure-controlled safety valve, wherein the pressure release rate can be selected so that a buildup of pressure is possible beyond the opening pressure P1 of the safety valve through the opening of the first valve device. The pressure buildup rate of the open first valve device is accordingly greater in absolute value than the pressure release rate of the open safety valve, in order to allow normal actuation of the clutch system outside of the case of a defect. In this way, in case of a defect, in particular upon loss of the switching control via the second valve device due to a power failure, a gradual buildup of pressure through small leaks at the aeration valves in the first valve device can be prevented.

It can expediently be provided that the safety valve closes again at a further pressure $P \geq P2$, wherein $P1<P2<Pd$. If the safety valve used closes again at a pressure level $P2>P1$, i.e., the safety valve only assumes its open switching state for pressures between P1 and P2, it can be ensured that the clutch system maintains the switching position in case of a defect which it had upon occurrence of the defect, since an actuating pressure $P \geq Pd$ already prevailing in the switching chamber is maintained.

It can advantageously be provided that the safety valve is arranged in a housing wall of the switching chamber. The arrangement of the safety valve in the housing wall of the switching chamber allows a simple and space-saving installation of the safety valve, wherein, in particular, no complete redesigns of previously used valve devices are required to integrate the functionality according to the invention.

Furthermore, a throttle may be provided, which is arranged in the second valve device and whose cross section is designed so that in the case of comparable switching states, a release of pressure occurring per unit of time via the second valve device is greater than a buildup of pressure occurring per unit of time via the first valve device. In particular, all switching states in which the same number of deaeration valves and aeration valves are simultaneously closed or open, respectively, are considered to be comparable switching states. In this way, an uncontrollable pressure increase in the switching chamber can be reliably prevented, as long as the valve provided in series to the throttle in the second valve device can be transferred into its open switching position. In particular, in this way an emergency operation of the clutch system can be ensured, if switching of the first valve device is not possible and it remains in its open switching position, for example, due to jamming or due to a mechanical defect. Furthermore, a leakage flow of the first valve device, i.e., the pressure medium flow, which flows through the first valve device in spite of the closed switching position, is simultaneously less than a further leakage flow of the second valve device.

In particular, a restoring spring may be provided, which is arranged in the first valve device and is designed so that a leakage flow of the first valve device is less than a further leakage flow of the second valve device. For example, the leakage flow of the first valve device can be reduced by the use of a harder restoring spring, which exerts a higher spring force on a switching piston of the aeration valve used. In the case of valves which are identical, except for the restoring springs used, in the first valve device and in the second valve device, accordingly, through the provision of a harder restoring spring in the first valve device than the restoring springs used in the second valve device, the leakage flow of the first valve device can be reduced to a value which is less than the leakage flow of the second valve device. This prevents a gradual buildup of pressure in the switching chamber, since the leakage flow flowing in via the first valve device can also flow out completely as the leakage flow of the second valve device when the second valve device is closed. In the event of a loss of the switching control via the valve devices, the switching chamber is therefore reliably prevented from "filling up".

An electrically switchable deaeration valve can expediently also be provided, which is arranged in the second valve device and is open in the deenergized state. In this way, in case of a defect, i.e., in particular in the event of a power failure, in which the first valve device and the second valve device are no longer switchable and are transferred into their mechanically predefined idle switching positions, a gradual buildup of pressure in the switching chamber by a leak in the first valve device, which is actually to assume its closed switching position, can be prevented.

In the method according to the invention, in the event of a defect of the first valve device and the second valve device, a subsequent buildup of pressure in the switching chamber sufficient for actuating the clutch system is avoided. In this way, the advantages and special features of the clutch system according to the invention are also implemented in the scope of a method. This also applies for the following particularly preferred embodiments of the method according to the invention.

This method is refined in that a safety valve is opened at a pressure $P \geq P1$, wherein $P1<Pd$.

It can expediently be provided that the safety valve is closed again at a pressure $P \geq P2$, wherein $P1<P2<Pd$.

It can advantageously be provided that, in the case of comparable switching states, more pressure medium is discharged per unit of time via the second valve device than is supplied per unit of time via the first valve device.

Furthermore, it can be provided that a leakage flow is caused by the first valve device which is at least compensated for by a further leakage flow caused by the second valve device.

It can expediently be provided that the second valve device is an electrically switchable valve, which is switched into its open switching position in the deenergized state.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
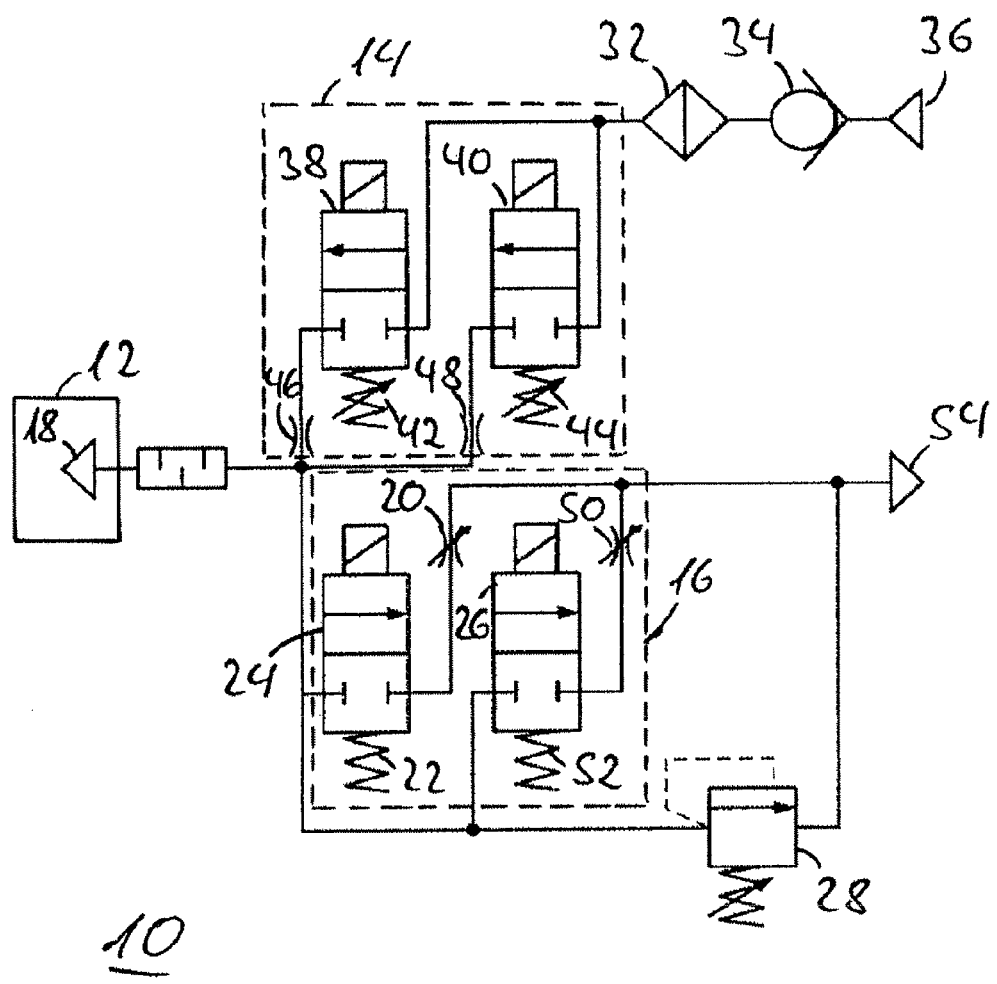
FIG. 1 shows a first embodiment of a clutch system according to the invention.

In the following, identical reference numerals in the drawings identify identical or similar parts.

FIG. 1 shows a first embodiment of a clutch system 10. In addition to the components already described in conjunction with FIG. 2, a switching chamber pressure increase avoidance device in the form of a safety valve 28 is provided, via which pressure medium can be discharged from the switching chamber 18 to the deaeration connection 54 while bypassing the second valve device 16. The coupling of the safety valve 28 to the deaeration connection 54 is to be understood as symbolic, and the safety valve 28 can, in particular, have a separate deaeration connection and, in particular, if compressed air is used as the pressure medium, can discharge it directly into the surroundings. If another pressure medium is used, for example, hydraulic oil, the deaeration connection 54 typically corresponds to a return line, which returns the used pressure medium into a reservoir (not shown) of a closed pressure medium circuit.

Figure 2:
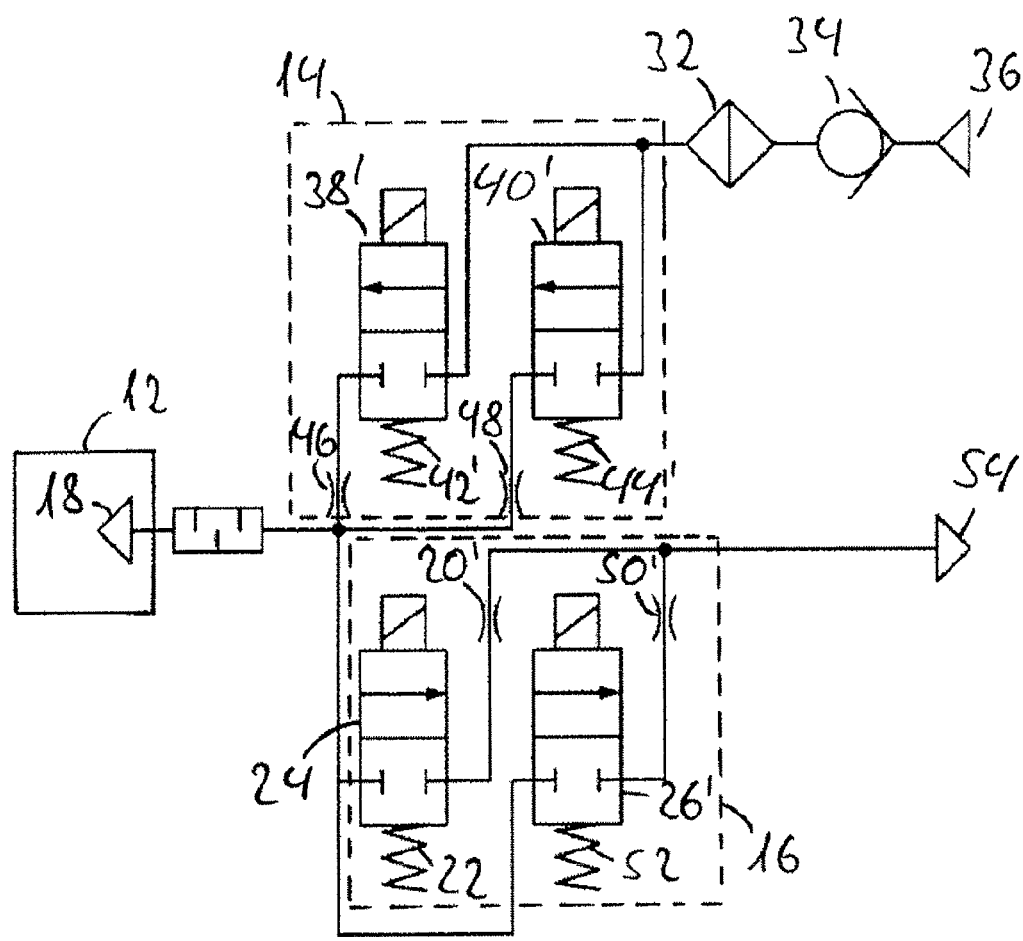
FIG. 2 shows a clutch system according to the prior art.

In relation to the clutch system 10 already known from FIG. 2, the first valve device 14 has modified aeration valves 38, 40, which include adapted restoring springs 42, 44. The spring forces applied by the restoring springs 42, 44 are typically somewhat greater, i.e., the restoring springs 42, 44 used are somewhat harder in order to reduce the leakage flows occurring in the first valve device 14 to a value which is less than the leakage flow caused by the second valve device 16. The pressure medium flow through the valve device occurring in spite of a closed switching position of a valve device is defined as the leakage flow. The basic principle of the leak reduction is comprehensible in particular upon the use of otherwise structurally-identical valves 38, 40, 24, 26 in the first and the second valve devices 14, 16, since then in the case of a harder restoring spring 42, 44, the leakage flow is reducible by the higher contact pressure of a provided switching piston on the associated valve seat. The spring force of the restoring springs 42, 44 is only slightly modified in relation to the restoring springs 42', 44' known from FIG. 2, so as not to lastingly influence the switching characteristics of the aeration valves 38, 40. The adaptation of the spring force can alternately be performed in only one or in both aeration valves.

Furthermore, throttles 20, 50 are provided in the second valve device 16 in FIG. 1, whose cross sections are designed so that a release of pressure via the second valve device 16 can occur more rapidly than a buildup of pressure via the first valve device 14. This can apply both in the case of open first valve device 14 and open second valve device 16 and also in the case of closed first valve device 14 and closed second valve device 16. If both the first valve device 14 and also the second valve device 16 are closed, this means that the leakage flow inflowing through the first valve device 14 is less than the leakage flow possibly outflowing through the second valve device 16, so that a buildup of pressure in the switching chamber 18 is avoided. If both the first valve device 14 and also the second valve device 16 are in their open switching positions, this means that a buildup of pressure in the switching chamber 18 is also not possible, which, for the case of a defect of only the first valve device 14, for example, due to jamming of the aeration valves 38, 40 or due to another mechanical defect which destroys the tightness of the first valve device 14, allows emergency operation solely by switching the second valve device 16. The adaptation of the throttle cross section can alternately be performed in only one or in both throttles 20, 50, only a small adaptation being provided so as not to influence the pressure release rates excessively strongly, since that would have effects on the switching characteristics of the clutch system 10.

FIG. 2 shows a clutch switching system according to the prior art, which was already described in the introduction.

Figure 3:
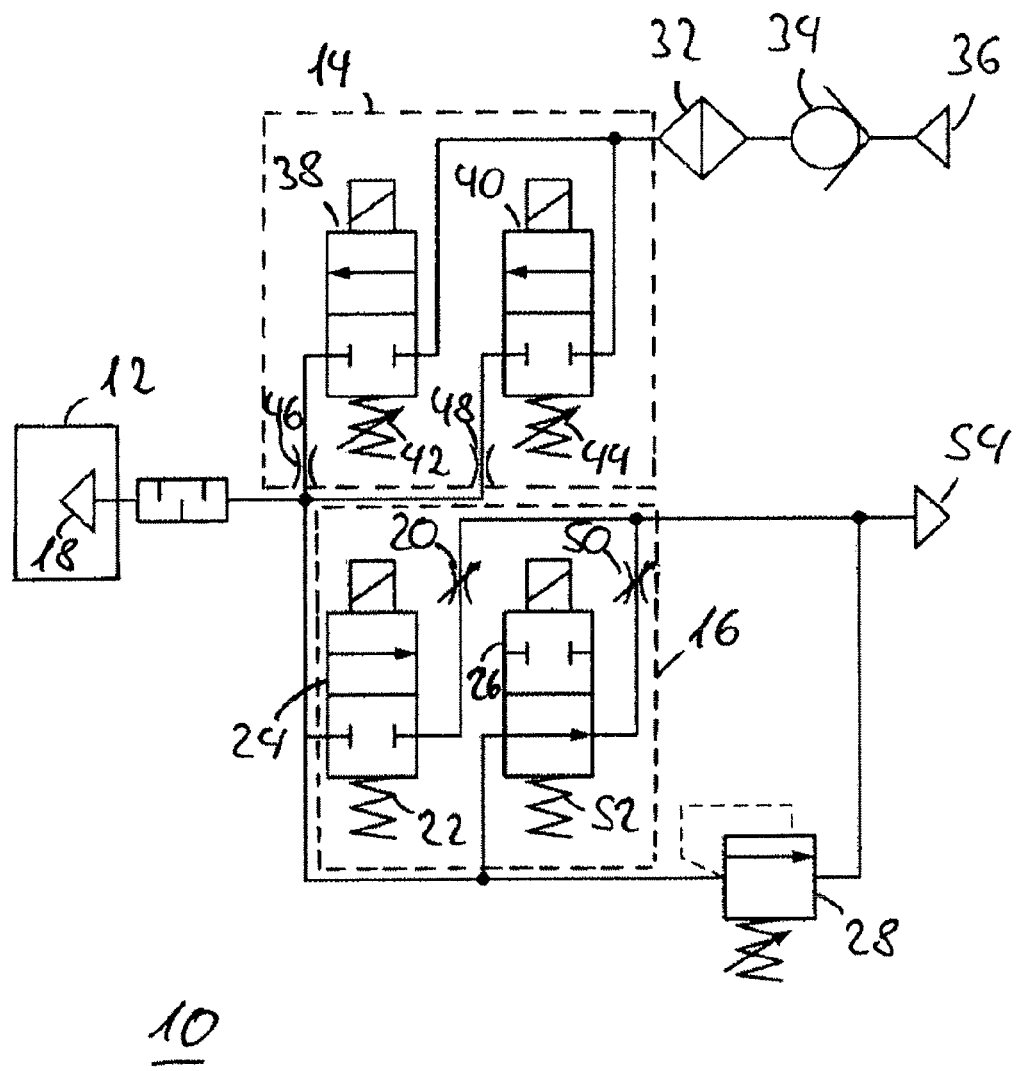
FIG. 3 shows a second embodiment of a clutch system according to the invention.

FIG. 3 shows a second embodiment of a clutch system according to the invention. In contrast to the first embodiment known from FIG. 1, the second embodiment shown in FIG. 3 includes a second deaeration valve 26, which is not closed, but rather open in its deenergized idle position. In case of a defect, in particular a power failure, the first valve device 14 is accordingly in its closed switching position, while the second valve device 16 at least has a second deaeration valve 26, via which a more rapid release of pressure is possible, so that a buildup of pressure in the switching chamber 18 of the clutch actuator 12 by a leakage flow of the first valve device 14 is not possible.

Figure 4:
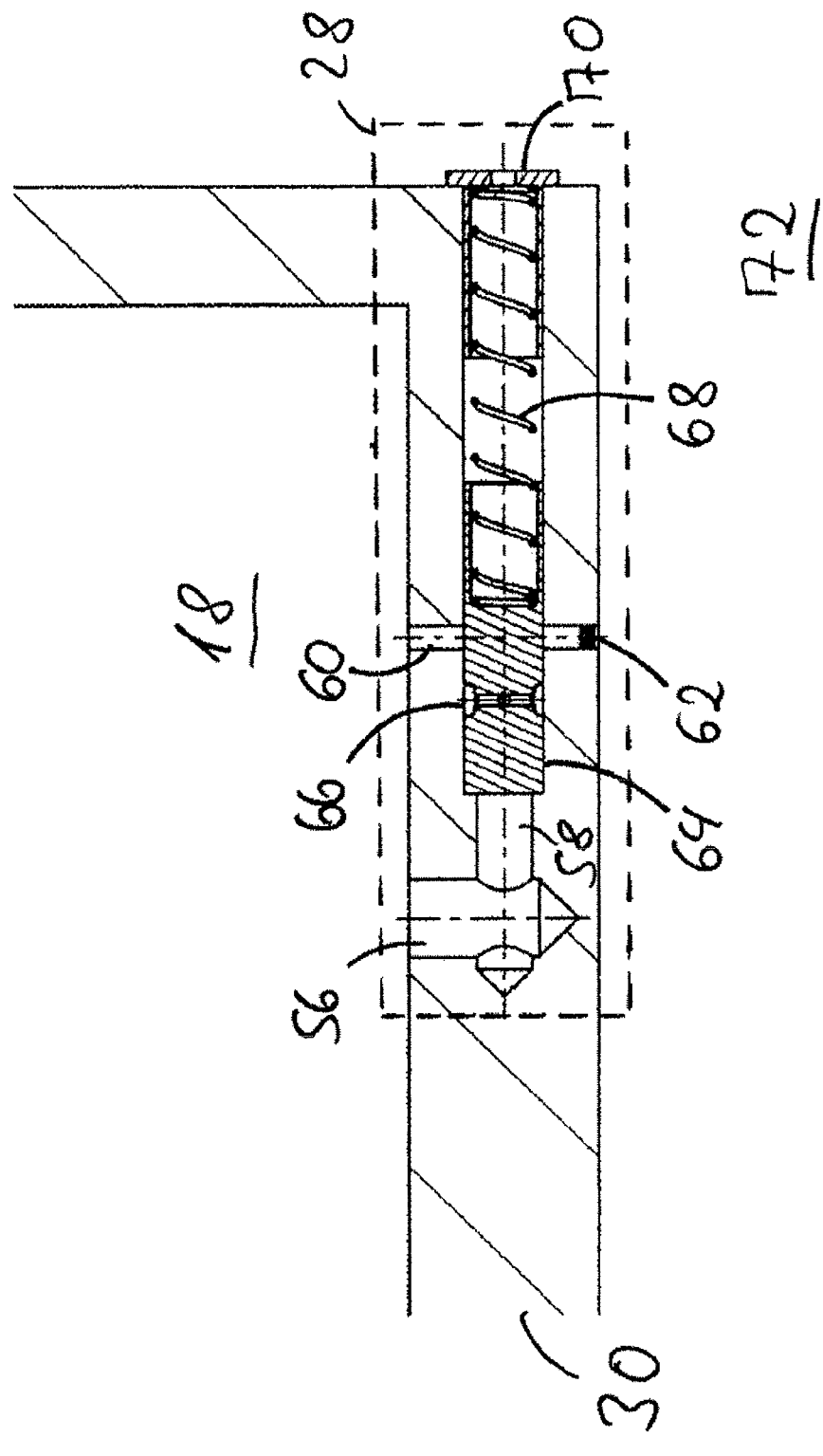
FIG. 4 shows a safety valve in a first switching position.
Figure 5:
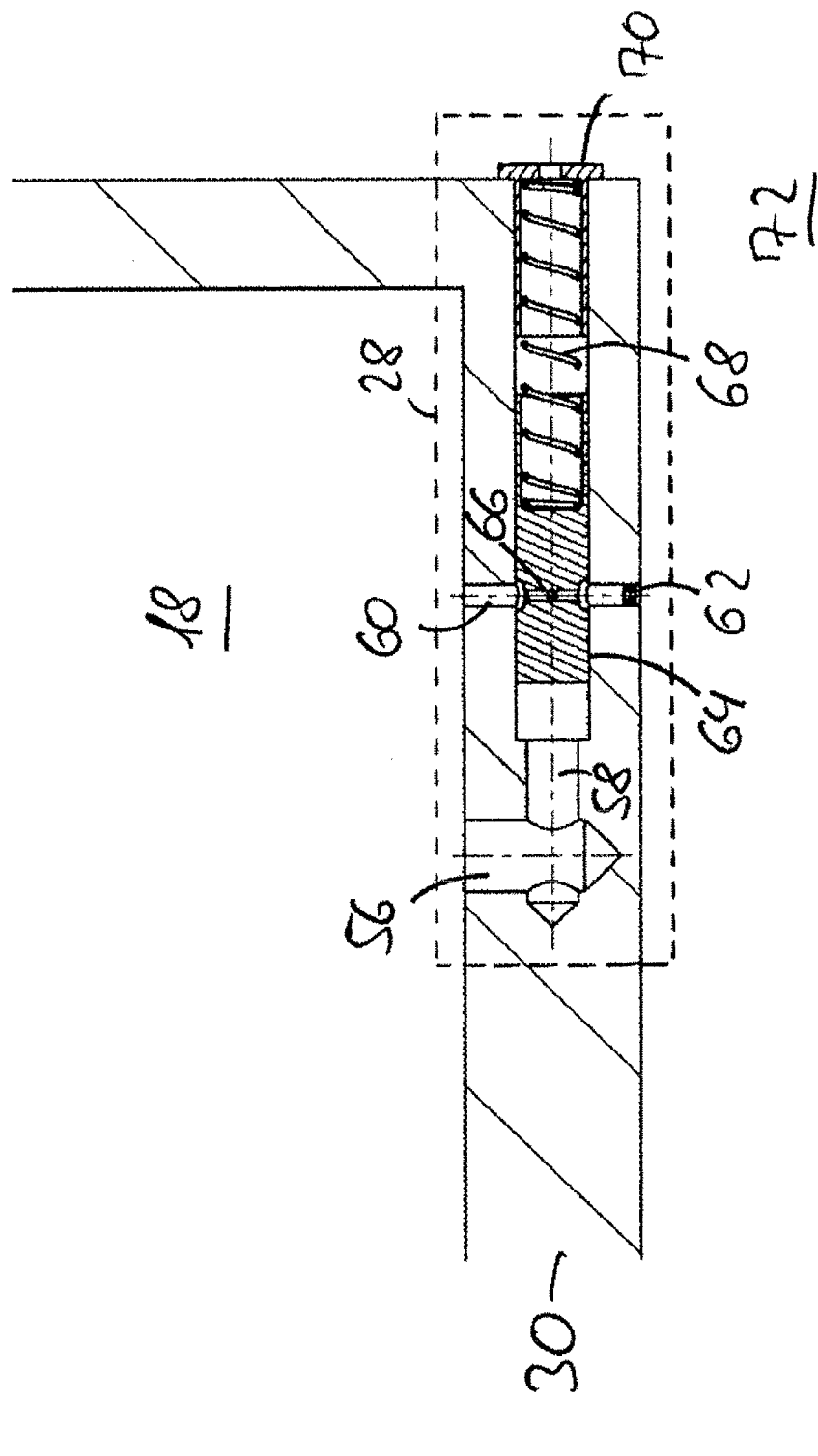
FIG. 5 shows the safety valve from FIG. 4 in a second switching position.
Figure 6:
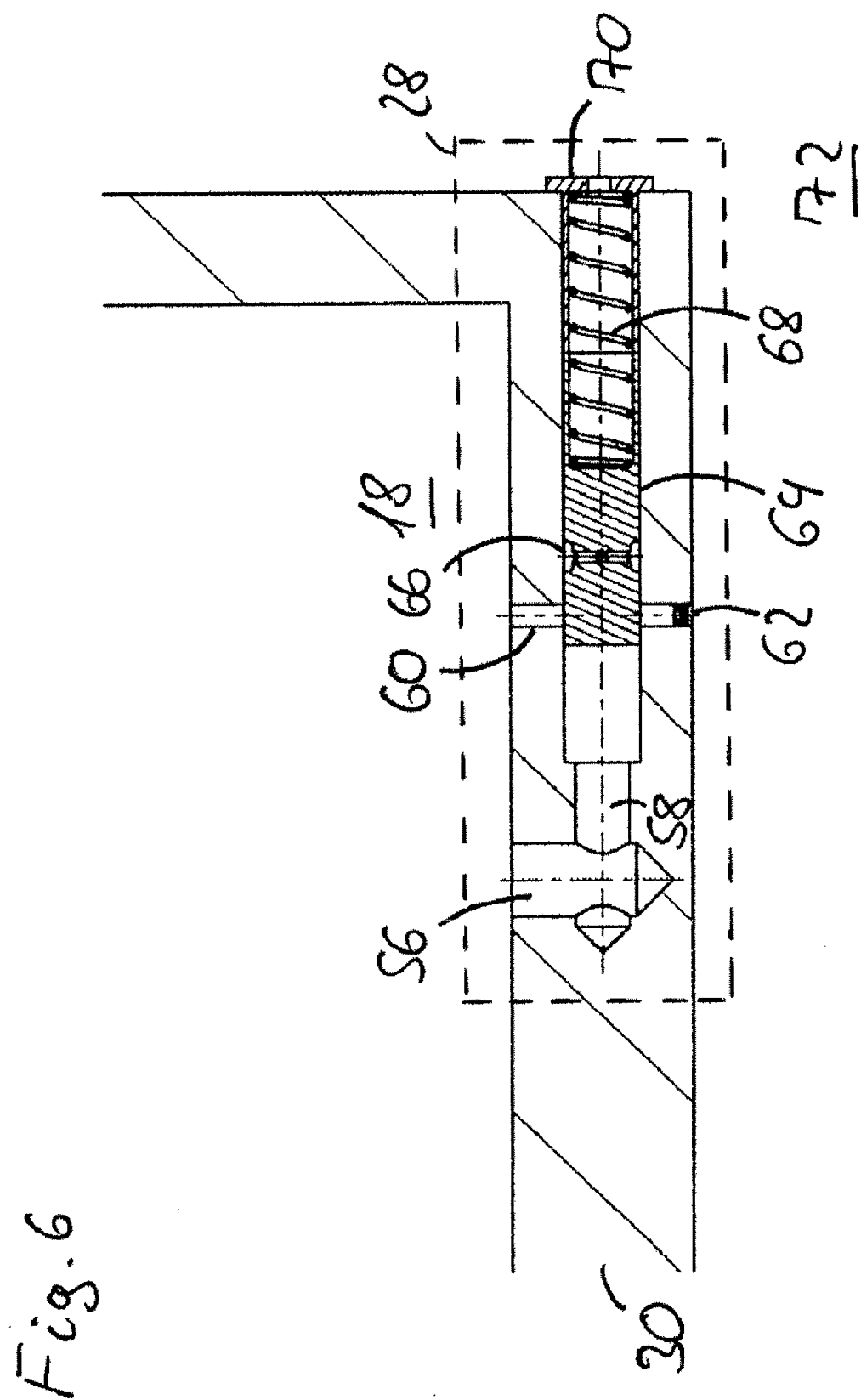
FIG. 6 shows the safety valve from FIG. 4 in a third switching position.

FIGS. 4, 5, and 6 show a safety valve in three different switching positions. The safety valve 28 shown in FIG. 4 is arranged in a housing wall 30, which tightly separates the switching chamber 18 from its surroundings 72. The housing wall 30 can also enclose the remaining valve devices (not shown) of the clutch system. The mechanism of the safety valve 28 is arranged in a second bore 58, which partially overlaps with a first bore 56. The first bore 56 is accessible from the switching chamber 18, while the second bore 58 is accessible from the surroundings 72. Furthermore, a deaeration channel 60 is provided, which connects the switching chamber 18 through the housing wall 30 to the surroundings 72, wherein the deaeration channel 60 preferably passes centrally through the second bore 58. In the interior of the second bore 58, a control piston 64 is arranged so it is movable, which is held by a spring 68, which is supported against a closure cap 70, in its illustrated idle position. The control piston 64 has a deaeration bore 66, which can be aligned with the deaeration channel 60 by axial displacement of the control piston 64 in the second bore 58.

In its illustrated first switching position, the control piston 64 of the safety valve 28 tightly closes the deaeration channel 60, so that the switching chamber 18 is tightly separated from the surroundings 72. A throttle 62 is arranged in the deaeration channel 60, via which the pressure release rate of the open safety valve 28 is settable. The closure cap 70 allows easy access to the safety valve 28 for maintenance purposes. The closure cap 70 is preferably fastened removably in or on the lateral bore 58, for example, as a screw, in particular a hollow screw, or as a hollow inserted sleeve, whose diameter is greater than the diameter of the second bore 58, so that the closure cap 70 is held by a clamping action. The closure cap 70 can have an opening to the surroundings 72, in order to also exert a restoring force on the control piston 64 via the ambient pressure.

In the first switching position of the safety valve 28 shown in FIG. 4, the pressure P prevailing in the switching chamber 18 is less than a first switching pressure P1 required for actuating the safety valve 28. The pressure P prevailing in the switching chamber 18 acts via the first bore 56 and the second bore 58 on a control surface of the switching piston 64 against the closing force applied by the spring 68. If the pressure P in the control chamber 18 increases, the force exerted on the control surface of the control piston 64 grows and the control piston 64 is moved to the right in the figure against the force applied by the spring 68. If the pressure P in the switching chamber 18 corresponds to the first switching pressure P1, the deaeration bore 66 arranged in the control piston 64 exposes the deaeration channel 60, so that a release of pressure from the control chamber 18 into the surroundings 72 can occur. This second switching position is shown in FIG. 5. As a result of the release of pressure, the force exerted on the control surface of the control piston decreases again until the pressure P in the control chamber 18 is again less than the first switching pressure P1. If the leakage flow of the first valve device 14 corresponds to the pressure release rate possible via the throttle 62, the safety valve 28 remains permanently in the illustrated second switching position.

If the pressure P in the switching chamber 18 increases more rapidly than a release of pressure can occur via the deaeration channel 60, wherein the pressure release rate is settable by the throttle 62, the switching piston 64 is displaced further to the right in the drawing by the higher pressure P now provided, until at a pressure P greater than a second switching pressure P2, the switching piston 64 again conceals the deaeration channel. In this third switching state, which is shown in FIG. 6, the safety valve 28 is closed again. The safety valve 28 shown in FIGS. 4 to 6 is accordingly only in an open switching position for pressures P which are between a first switching pressure P1 and a second switching pressure P2. The second switching pressure P2 is preferably less than a switching pressure Pd required for actuating the clutch actuator.

LIST OF REFERENCE NUMERALS 10 clutch system
12 clutch actuator
14 first valve device
16 second valve device
18 switching chamber
20 throttle
20' throttle
22 restoring spring
24 first deaeration valve
26 second deaeration valve
26' second deaeration valve
28 safety valve
30 housing wall
32 filter
34 check valve
36 supply connection
38 first aeration valve
38' first aeration valve
40 second aeration valve
40' second aeration valve
42 restoring spring
42' restoring spring
44 restoring spring
44' restoring spring
46 throttle
48 throttle
50 throttle
50' throttle
52 restoring spring
54 deaeration connection
56 first bore
58 second bore
60 deaeration channel
62 throttle
64 control piston
66 deaeration bore
68 spring
70 closure cap
72 surroundings The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A clutch system for closing and interrupting a force flow, comprising:
    a clutch actuator to which pressure medium is applyable;
    a first electrically actuatable valve device;
    a second electrically actuatable valve device, wherein pressure medium is supplyable via the first valve device to a switching chamber of the clutch actuator in order to build-up pressure and wherein supplied pressure medium is dischargeable again via the second valve device to release pressure, the clutch system interrupting or closing the force flow at a pressure $P \geq Pd$ in the switching chamber; and
    a switching chamber pressure increase avoidance device operatively configured such that, in an event of a defect of the first valve device and the second valve device, a subsequent pressure increase in the switching chamber sufficient to actuate the clutch system is avoided,
    wherein the avoidance device comprises a safety valve, operatively configured to open at a pressure $P \geq P1$ wherein $P1 < Pd$;
    wherein the safety valve is further operatively configured to close at a further pressure $P \geq P2$, wherein $P1 < P2 < Pd$.

2. The clutch system according to claim 1, wherein the safety valve is arranged in a housing wall of the switching chamber.

3. The clutch system according to claim 1, wherein the avoidance device comprises a throttle operatively arranged in the second valve device, the throttle having a cross-section configured so that in comparable switching states, a release of pressure occurring per unit of time via the second valve device is greater than a buildup of pressure occurring per unit of time via the first valve device.

4. The clutch system according to claim 1, wherein the avoidance device comprises a restoring spring operatively arranged in the first valve device and being configured so that a leakage flow of the first valve device is less than a further leakage flow of the second valve device.

5. The clutch system according to claim 1, wherein the avoidance device comprises an electrically switchable deaeration valve operatively arranged in the second valve device and being open in a deenergized state.

6. A method for operating a clutch system for closing and interrupting a force flow, the clutch system having a clutch actuator to which pressure medium is applied and first and second electrically actuatable valve devices, the method comprising the acts of:
    supplying pressure medium via the first valve device to a switching chamber of the clutch actuator to build up pressure;
    discharging the supplied pressure medium via the second valve device to release pressure in the switching chamber, the clutch system interrupting or closing the force flow at a pressure $P \geq Pd$ in the switching chamber;
    in an event of a defect of the first and second valve devices, preventing a subsequent buildup of pressure in the switching chamber, which subsequent buildup is sufficient to actuate the clutch system;
    wherein the act of preventing the subsequent buildup is carried out via a safety valve which is opened at a pressure $P \geq P1$, wherein $P1 < Pd$; and
    wherein the safety valve closes again at a pressure $P \geq P2$, wherein $P1 < P2 < Pd$.

7. The method according to claim 6, wherein the act of preventing the subsequent buildup of pressure is carried out by discharging more pressure medium per unit of time via the second valve device than is supplied per unit of time via the first valve device in a case of comparable switching states.

8. The method according to claim 6, wherein the act of preventing the subsequent buildup is carried out by compensating for a leakage flow caused by the first valve device by a further leakage flow caused by the second valve device.

9. The method according to claim 6, wherein the act of preventing the subsequent buildup is carried out by switching an electrically switchable valve as the second valve device into an open switching position in a deenergized state.

* * * * *